United States Patent
Yoshihara

(10) Patent No.: US 6,421,786 B1
(45) Date of Patent: Jul. 16, 2002

(54) VIRTUAL SYSTEM TIME MANAGEMENT SYSTEM UTILIZING A TIME STORAGE AREA AND TIME CONVERTING MECHANISM

(75) Inventor: Shinji Yoshihara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/266,781

(22) Filed: Mar. 12, 1999

(30) Foreign Application Priority Data

Mar. 13, 1998 (JP) .......................................... 10-082994

(51) Int. Cl.[7] .............................................. G06F 1/08
(52) U.S. Cl. ......................... 713/500; 713/600; 710/58
(58) Field of Search ................................ 713/400, 500, 713/401, 502, 503, 600, 501, 601; 710/21, 25, 58, 60, 61; 709/400

(56) References Cited

U.S. PATENT DOCUMENTS

| | | | | |
|---|---|---|---|---|
| 4,454,604 A | * | 6/1984 | Myers ............................ | 375/1 |
| 4,803,708 A | * | 2/1989 | Momose ....................... | 377/28 |
| 5,386,536 A | * | 1/1995 | Courts et al. ................. | 701/69 |
| 5,455,931 A | * | 10/1995 | Camporse et al. .......... | 713/400 |
| 5,617,561 A | * | 4/1997 | Blaauw et al. ............... | 395/500 |
| 5,649,164 A | * | 7/1997 | Childs ......................... | 395/500 |
| 5,802,354 A | * | 9/1998 | Kubala et al. ............... | 713/400 |
| 5,898,855 A | * | 4/1999 | Onodera et al. ............... | 709/11 |
| 5,956,261 A | * | 9/1999 | Blaauw et al. ............... | 364/578 |
| 5,991,812 A | * | 11/1999 | Srinivasan ................... | 709/232 |

FOREIGN PATENT DOCUMENTS

JP            9-171458         6/1997

\* cited by examiner

*Primary Examiner*—Jeffrey Gaffin
*Assistant Examiner*—Rijue Mai
(74) *Attorney, Agent, or Firm*—Young & Thompson

(57) ABSTRACT

To allow an AP which performs operation based on a time of a system clock and another AP which performs operation based on a user-specified time to be executed concurrently in a data processing unit with only one system clock without having to change the time of the system clock, virtual system time setting means 5 receive a command or job start date and/or time from an input/output unit 2 and store it in a virtual system time storage area 4. In response to a system date acquisition function 6 or a system time acquisition function 7 from a command or a job, virtual system time converting means return either the date of the system clock when the date is not stored in the virtual system time storage area 4 or the date stored in the date storage area when the date is stored therein. The means also return either the time of the system clock when the time is not stored in the virtual system time storage area or the time of said system clock plus the time stored in said time storage area when the time is stored therein.

15 Claims, 2 Drawing Sheets

VIRTUAL SYSTEM TIME MANAGEMENT SYSTEM UTILIZING A TIME STORAGE AREA AND TIME CONVERTING MECHANISM

BACKGROUND OF THE INVENTION

1. Field of the Invention

The present invention relates to a virtual system time management system, a management method, and a recording medium for storing a management program which allow some application programs (hereafter called APs) to be executed based on the time of the system clock and some other APs to be executed based on a time virtually set up.

2. Description of the Related Art

In a conventional data processing system, it is requested to check and evaluate that all APs in the system will be executed correctly when the year 2000 comes.

This evaluation is done, for example, by forcing the date of the system clock in the data processing system to be changed to Dec. 31st, 1999 and then executing an AP across the midnight (until Jan. 1st, 2000 comes). This allows the user to check the AP for an error in the processing result.

In the above method, however, the change in the time of the system clock affects all APs to be executed in the data processing system, meaning that all APs are based on the changed time. In other words, once the system time is changed, the user cannot execute APs that must be executed based on the time before the change (such as production-run APs).

An earlier patent disclosure dealing with this is found in Japanese laid-open patent application heisei 9-171458. The technique disclosed in this patent application is that one computer system has multiple platforms each with its own system clock.

However, the technique disclosed in Japanese laid-open patent application heisei 9-171458 causes multiple platforms to share the resources of one computer system, such as the CPU and memory. Thus, an AP in each platform can use the amount of resources smaller than that allocated in the single-platform system. In such a system, there are performance problems such longer processing times.

SUMMARY OF THE INVENTION

It is an object of the present invention to enable an AP which performs operation based on the original system time and another AP which performs operation based on a changed system time to be executed concurrently in a data processing unit with a single system clock without having to change the system time of the system clock.

The first virtual system time management system according to the present invention for use in a data processing unit with a single system clock indicating the current date and time comprises virtual system time setting means for receiving, and storing in a virtual system time storage area, a date different from the current date indicated by said system clock and/or a time different from the current time indicated by said system clock from an input/output unit; and virtual system time converting means responsive to a system date acquisition request from a command or a job in execution for returning, when a date is stored therein, that date stored in said virtual system time storage area and responsive to a system time acquisition request from the command or the job in execution for returning, when a time is stored therein, the sum of the current time indicated by said system clock and that time stored in said virtual system time storage area.

The second virtual system time management system according to the present invention for use in a data processing unit with a single system clock indicating the current date and time comprises virtual system time setting means for receiving, and storing in a virtual system time storage area, a date different from the current date indicated by said system clock and/or a time different from the current time indicated by said system clock from an input/output unit; and virtual system time converting means responsive to a system date acquisition request from a command or a job in execution for returning, when a date is not stored in said virtual system time storage area, the current date indicated by said system clock and responsive to a system time acquisition request from the command or the job in execution for returning, when a time is not stored in said virtual system time storage area, the current time indicated by said system clock.

The third virtual system time management system according to the present invention for use in a data processing unit with a single system clock indicating the current date and time comprises a virtual system time storage area containing a plurality of entries each being composed of a command or job identifier field, a date storage field, and a time storage field; virtual system time setting means for receiving a command or job identifier from an input/output unit and storing the identifier into the command or job identifier field of an entry of said virtual system time storage area, for, when receiving a date different from the current date indicated by said system clock with the command or job identifier from the input/output unit, storing that date into the date storage field of the entry into which the command or job identifier is stored for, when receiving a time different from the current time indicated by said system clock with the command or job identifier from the input/output unit, storing that time into the time storage field of the entry into which the command or job identifier is stored; and virtual system time converting means responsive to a system date acquisition request from a command or a job in execution for returning, either when a date is not stored in said date storage field of the entry corresponding to the identifier of the command or the job in said virtual system time storage area, the current date indicated by said system clock, or when a date is stored therein, that date stored in said date storage field and responsive to a system time acquisition request from the command or the job in execution for returning, either when a time is not stored in said time storage field of the entry corresponding to the identifier of the command or the job in said virtual system time storage area, the current time indicated by said system clock, or when a time is stored therein, that time stored in said time storage field.

The first virtual system time management method according to the present invention comprises, in a data processing unit with a single system clock indicating the current date and time, receiving, and storing in a virtual system time storage area, a date different from the current date indicated by said system clock and/or a time different from the current time indicated by said system clock from an input/output unit; and, in said data processing unit, responsive to a system date acquisition request from a command or a job in execution for returning, when a date is stored therein, that date stored in said virtual system time storage area and responsive to a system time acquisition request from the command or the job in execution for returning, when a time is stored therein, the sum of the current time indicated by said system clock and that time stored in said virtual system time storage area.

The second virtual system time management method according to the present invention comprises, in a data processing unit with a single system clock indicating the current date and time, receiving, and storing in a virtual system time storage area, a date different from the current date indicated by said system clock and/or a time different from the current time indicated by said system clock from an input/output unit; and, in said data processing unit, responsive to a system date acquisition request from a command or a job in execution for returning, when a date is not stored in said virtual system time storage area, the current date indicated by said system clock and responsive to a system time acquisition request from the command or the job in execution for returning, when a time is not stored in said virtual system time storage area, the current time indicated by said system clock.

The third virtual system time management method according to the present invention comprises, in a data processing unit with a single system clock indicating the current date and time, receiving a command or job identifier from an input/output unit and storing the identifier into the command or job identifier field of an entry of said virtual system time storage area containing a plurality of entries each being composed of a command or job identifier field, a date storage field, and a time storage field, for, when receiving a date different from the current date indicated by said system clock with the command or job identifier from the input/output unit, storing that date into the date storage field of the entry into which the command or job identifier is stored for, when receiving a time different from the current time indicated by said system clock with the command or job identifier from the input/output unit, storing that time into the time storage field of the entry into which the command or job identifier is stored; and, in said data processing unit, responsive to a system date acquisition request from a command or a job in execution for returning, either when a date is not stored in said date storage field of the entry corresponding to the identifier of the command or the job in said virtual system time storage area, the current date indicated by said system clock, or when a date is stored therein, that date stored in said date storage field and responsive to a system time acquisition request from the command or the job in execution for returning, either when a time is not stored in said time storage field of the entry corresponding to the identifier of the command or the job in said virtual system time storage area, the current time indicated by said system clock, or when a time is stored therein, that time stored in said time storage field.

The first recording medium according to the present invention is a recording medium having stored therein a program which causes a data processing unit with a single system clock indicating the current date and time to perform virtual system time setting processing for receiving, and storing in a virtual system time storage area, a date different from the current date indicated by said system clock and/or a time different from the current time indicated by said system clock from an input/output unit; and virtual system time converting processing responsive to a system date acquisition request from a command or a job in execution for returning, when a date is stored therein, that date stored in said virtual system time storage area and responsive to a system time acquisition request from the command or the job in execution for returning, when a time is stored therein, the sum of the current time indicated by said system clock and that time stored in said virtual system time storage area.

The second recording medium according to the present invention is a recording medium having stored therein a program which causes a data processing unit with a single system clock indicating the current date and time to perform virtual system time setting processing for receiving, and storing in a virtual system time storage area, a date different from the current date indicated by said system clock and/or a time different from the current time indicated by said system clock from an input/output unit; and virtual system time converting processing responsive to a system date acquisition request from a command or a job in execution for returning, when a date is not stored in said virtual system time storage area, the current date indicated by said system clock and responsive to a system time acquisition request from the command or the job in execution for returning, when a time is not stored in said virtual system time storage area, the current time indicated by said system clock.

The third recording medium according to the present invention is a recording medium having stored therein a program which causes a data processing unit with a single system clock indicating the current date and time to perform virtual system time setting processing for receiving a command or job identifier from an input/output unit and storing the identifier into the command or job identifier field of an entry of said virtual system time storage area containing a plurality of entries each being composed of a command or job identifier field, a date storage field, and a time storage field, for, when receiving a date different from the current date indicated by said system clock with the command or job identifier from the input/output unit, storing that date into the date storage field of the entry into which the command or job identifier is stored for, when receiving a time different from the current time indicated by said system clock with the command or job identifier from the input/output unit, storing that time into the time storage field of the entry into which the command or job identifier is stored; and virtual system time converting processing responsive to a system date acquisition request from a command or a job in execution for returning, either when a date is not stored in said date storage field of the entry corresponding to the identifier of the command or the job in said virtual system time storage area, the current date indicated by said system clock, or when a date is stored therein, that date stored in said date storage field and responsive to a system time acquisition request from the command or the job in execution for returning, either when a time is not stored in said time storage field of the entry corresponding to the identifier of the command or the job in said virtual system time storage area, the current time indicated by said system clock, or when a time is stored therein, that time stored in said time storage field.

The first group of recording media according to the present invention is a group of recording media, wherein said program in any one of the first to third recording media is divided into a plurality of portions and said portions are recorded on said media, respectively.

BRIEF DESCRIPTION OF THE DRAWINGS

The invention will be understood more fully from the detailed description given here below and from the accompanying drawings of preferred embodiments of the invention, which, however, should be considered as limiting the invention but are for explanation and understanding only.

Here, it should be noted that like reference numerals represent like elements throughout the disclosure.

DETAILED DESCRIPTION OF THE PREFERRED EMBODIMENTS

An embodiment according to the present invention will be described in detail with reference to the attached drawings.

Figure 1:
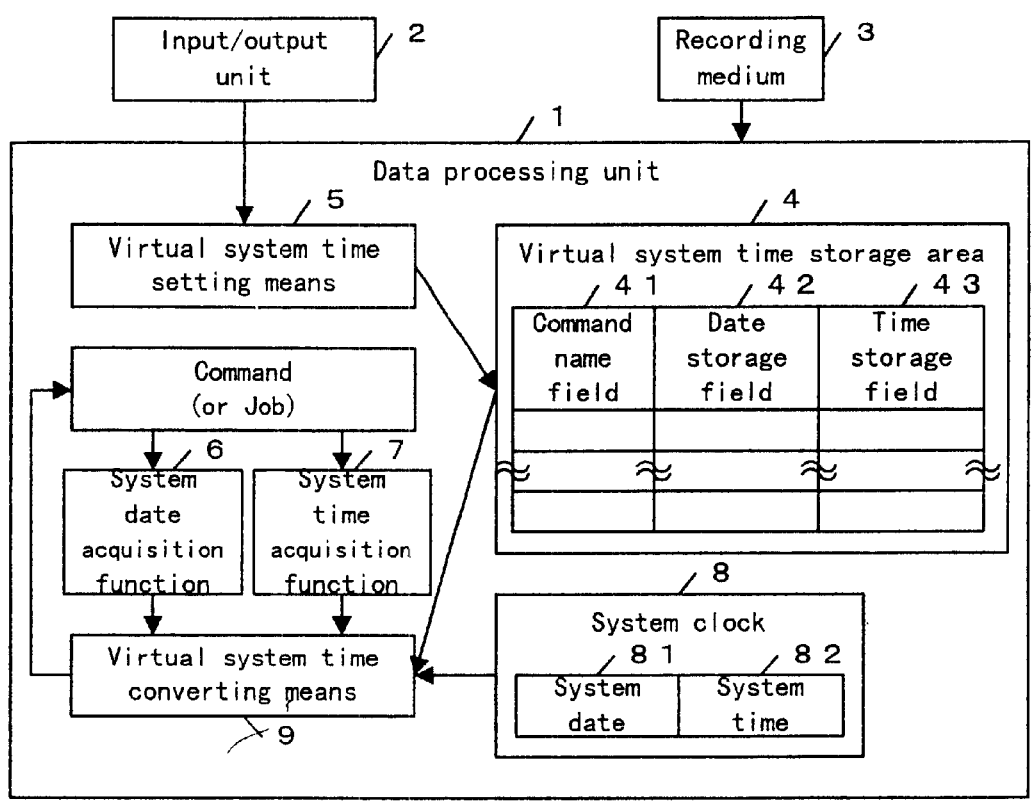
FIG. 1 is a block diagram showing the configuration of an embodiment according to the present invention.

Referring to FIG. 1, the embodiment according to the present invention comprises a data processing unit 1 operating under program control and an input/output unit 2, such as a terminal or a console, connected to the data processing unit 1.

A variation of this embodiment may comprise the data processing unit 1 and a recording medium 3, such as a magnetic disk unit or a semiconductor memory, connected via a signal line. In such a variation, the data processing unit 1 loads a program from the recording medium 3 via the signal line for executing processing which will be described below.

The data processing unit 1 comprises virtual system time setting means 5 and virtual system time converting means 9. The virtual system time setting means 5 receive commands or jobs and their start dates and/or start times from the input/output unit 2 and store them into a virtual system time storage area 4. The virtual system time converting means 9, when called by a system date acquisition function 6 or a system time acquisition function 7, return date and/or time information according to what is stored in the virtual system time storage area 4. That is, when the virtual system time storage area 4 does not contain a user-specified date, the virtual system time setting means 5 return the date of a system clock 8; when the virtual system time storage area 4 does not contain a user-specified time, the means return the time of the system clock 8; when the virtual system time storage area 4 contains a user-specified date, the means return the user-specified date; when the virtual system time storage area 4 contains a user-specified time, the means return the time calculated by adding the time of the system clock 8 to the user-specified time.

The virtual system time storage area 4 is composed of multiple entries, each consisting of a command name (job name) 41, a date storage area 42, and a time storage area 43. In this embodiment, the command name (or job name) 41 is associated with the date storage area 42 and the time storage area 43. Instead of the command name or job name, any identifier may be associated with the date storage area 42 and the time storage area 43 provided the identifier identifies the command or job.

The system clock 8 comprises a system date 81 and a system time 82.

Figure 2:
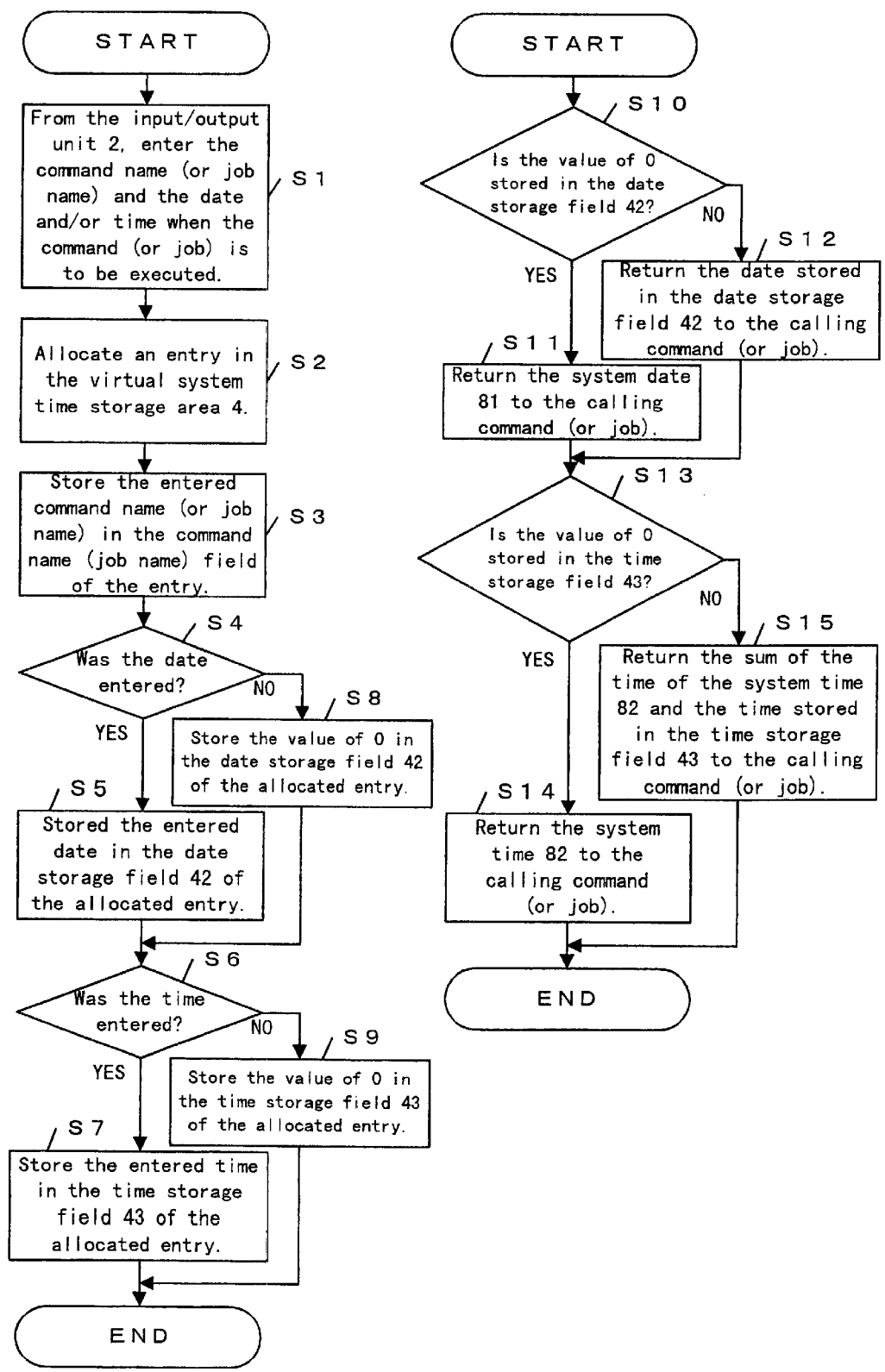
FIG. 2 is a flowchart showing the operation of the embodiment according to the present invention.

Next, the overall operation of the embodiment according to the present invention will be described in detail with reference to FIG. 1 and FIG. 2.

From the input/output unit 2, the user enters the name of a command (or the name of a job) to be executed in the data processing unit 1 and the date and/or time when the command (or job) is to be executed (step S1).

Upon receiving the command (or job), the virtual system time setting means 5 allocates an entry in the virtual system time storage area 4 (step S2) and stores the received command name (or job name) into the command name (job name) 41 (step S3).

Then, the virtual system time setting means 5 checks to see if the date was entered in step S1 (step S4). When the virtual system time setting means 5 finds that date was entered, the means stores the date in the date storage area 42 of the entry allocated in step S2 (step S5). Similarly, the virtual system time setting means 5 checks to see if the time was entered in step Si (step S6). When the virtual system time setting means 5 finds that the time was entered, the means store the time in the time storage area 43 allocated in step S2 (step S7).

When the virtual system time setting means 5 finds that the date was not entered in step S4, the means stores the value of 0 in the date storage area 42 (step S8). Similarly, when the virtual system time setting means 5 finds that the time was not entered in step S6, the means stores the value of 0 in the time storage area 43 (step S9).

When the command (or job) calls the system date acquisition function 6, the virtual system time converting means 9 checks if the date storage area 42 corresponding to the command name does not contain a date (the area contains 0) (step S10). When the virtual system time converting means 9 find that the date storage area 42 does not contain a date (contains 0), the means return the system date 81 of the system clock 8 to the command (or job) (step S11). When the virtual system time converting means 9 find that the date storage area 42 contains a date, the means return the stored date to the command (or job) (step S12).

When the command (or job) calls the system time acquisition function 7, the virtual system time converting means 9 checks if the time storage area 43 corresponding to the command name does not contain a date (the area contains 0) (step S10). When the virtual system time converting means 9 find that the time storage area 43 does not contain a time (contains 0), the means return the system time 82 of the system clock 8 to the command (or job) (step S14). When the virtual system time converting means 9 find that the time storage area 43 contains a time, the means add the system time 82 to the time stored in the time storage area 43 and return the resulting time to the command (or job) (step S15).

In step S15, it is possible for the virtual system time converting means 9 to return the time stored in the time storage area 43 without adding the system time 82 to it. However, some commands (or jobs) call the system time acquisition function 7 more than once to perform processing according to the elapsed time. In this case, if these commands get the time from the time storage area 43 where the constant time data is stored, the operation of these commands cannot be evaluated. To solve this problem, the embodiment of the present invention adds the system time 82 to the time stored in the time storage area 43 and returns the resulting time to the calling command (or job), as shown in step S15. This allows those commands (or jobs) to perform processing according to the elapsed time.

As described above, the present invention enables an AP which performs operation based on the original system time and another AP which performs operation based on a changed system time to be executed concurrently in a data processing unit with a single platform without having to change the system time of the system clock.

Although the invention has been described in detail above in connection with various preferred embodiments thereof, it will be appreciated by those skilled in the art that these embodiments have been provided solely for purposes of illustration, and are in no way to be considered as limiting the invention. Instead, various modifications and substitutions of equivalent techniques will be readily apparent to those skilled in the art upon reading this specification, and such modifications and substitutions are to be considered as falling within the true scope and spirit of the following claims.

What is claimed is:

1. A virtual system time management system for use in a data processing unit with a single system clock indicating the current date and time, said system comprising:

a virtual system time storage area having a plurality of records, each of the records comprising a command name field, a date storage field, and a time storage field;

virtual system time setting means for receiving, and storing in the virtual system time storage area, a date different from the current date indicated by said system clock and/or a time different from the current time indicated by said system clock from an input/output unit; and virtual system time converting means responsive to a system date acquisition request from a command or a job in execution for returning, when a date is stored therein, that date stored in said virtual system time storage area and responsive to a system time acquisition request from the command or the job in execution for returning, when a time is stored therein, the sum of the current time indicated by said system clock and that time stored in said virtual system time storage area.

2. A virtual system time management system for use in a data processing unit with a single system clock indicating the current date and time, said system comprising:

a virtual system time storage area having a plurality of records, each of the records comprising a command name field, a date storage field, and a time storage field;

virtual system time setting means for receiving, and storing in the virtual system time storage area, a date different from the current date indicated by said system clock and/or a time different from the current time indicated by said system clock from an input/output unit; and virtual system time converting means responsive to a system date acquisition request from a command or a job in execution for returning, when a date is not stored in said virtual system time storage area, the current date indicated by said system clock and responsive to a system time acquisition request from the command or the job in execution for returning, when a time is not stored in said virtual system time storage area, the current time indicated by said system clock.

3. A virtual system time management system for use in a data processing unit with a single system clock indicating the current date and time, said system comprising:

a virtual system time storage area containing a plurality of entries each being composed of a command or job identifier field, a date storage field, and a time storage field;

virtual system time setting means for receiving a command or job identifier from an input/output unit and storing the identifier into the command or job identifier field of an entry of said virtual system time storage area, for, when receiving a date different from the current date indicated by said system clock with the command or job identifier from the input/output unit, storing that date into the date storage field of the entry into which the command or job identifier is stored for, when receiving a time different from the current time indicated by said system clock with the command or job identifier from the input/output unit, storing that time into the time storage field of the entry into which the command or job identifier is stored; and virtual system time converting means responsive to a system date acquisition request from a command or a job in execution for returning, either when a date is not stored in said date storage field of the entry corresponding to the identifier of the command or the job in said virtual system time storage area, the current date indicated by said system clock, or when a date is stored therein, that date stored in said date storage field and responsive to a system time acquisition request from the command or the job in execution for returning, either when a time is not stored in said time storage field of the entry corresponding to the identifier of the command or the job in said virtual system time storage area, the current time indicated by said system clock, or when a time is stored therein, that time stored in said time storage field.

4. A virtual system time management method comprising:

providing a virtual system time storage area having a plurality of records, each said record comprising a command name field, a date storage field, and a time storage field;

in a data processing unit with a single system clock indicating the current date and time, receiving, and storing in the virtual system time storage area, a date different from the current date indicated by said system clock and/or a time different from the current time indicated by said system clock from an input/output unit; and in said data processing unit, responsive to a system date acquisition request from a command or a job in execution for returning, when a date is stored therein, that date stored in said virtual system time storage area and responsive to a system time acquisition request from the command or the job in execution for returning, when a time is stored therein, the sum of the current time indicated by said system clock and that time stored in said virtual system time storage area.

5. A virtual system time management method comprising:

providing a virtual system time storage area having a plurality of records, each said record comprising a command name field, a date storage field, and a time storage field;

in a data processing unit with a single system clock indicating the current date and time, receiving, and storing in the virtual system time storage area, a date different from the current date indicated by said system clock and/or a time different from the current time indicated by said system clock from an input/output unit; and in said data processing unit, responsive to a system date acquisition request from a command or a job in execution for returning, when a date is not stored in said virtual system time storage area, the current date indicated by said system clock and responsive to a system time acquisition request from the command or the job in execution for returning, when a time is not stored in said virtual system time storage area, the current time indicated by said system clock.

6. A virtual system time management method comprising:

providing a virtual system time storage area having a plurality of records, each said record comprising a command name field, a date storage field, and a time storage field;

in a data processing unit with a single system clock indicating the current date and time, receiving a command or job identifier from an input/output unit and storing the identifier into the command name field of an entry of said virtual system time storage area, for, when receiving a date different from the current date indicated by said system clock with the command or job identifier from the input/output unit, storing that date into the date storage field of the entry into which the command or job identifier is stored for, when receiving a time different from the current time indicated by said system clock with the command or job identifier from the input/output unit, storing that time into the time storage field of the entry into which the command or job identifier is stored; and in said data processing unit, responsive to a system date acquisition request from a command or a job in execution for returning, either when a date is not stored in said date storage field of the entry corresponding to the identifier of the command or the job in said virtual system time storage area, the current date indicated by said system clock, or when a date is stored therein, that date stored in said date storage field and responsive to a system time acquisition request from the command or the job in execution for returning, either when a time is not stored in said time storage field of the entry corresponding to the identifier of the command or the job in said virtual system time storage area, the current time indicated by said system clock, or when a time is stored therein, that time stored in said time storage field.

7. A recording medium having stored therein a program which causes a data processing unit with a single system clock indicating the current date and time to perform:

providing a virtual system time storage area having a plurality of records, each of the records comprising a command name field, a date storage field, and a time storage field;

virtual system time setting processing for receiving, and storing in the virtual system time storage area, a date different from the current date indicated by said system clock and/or a time different from the current time indicated by said system clock from an input/output unit; and virtual system time converting processing responsive to a system date acquisition request from a command or a job in execution for returning, when a date is stored therein, that date stored in said virtual system time storage area and responsive to a system time acquisition request from the command or the job in execution for returning, when a time is stored therein, the sum of the current time indicated by said system clock and that time stored in said virtual system time storage area.

8. A recording medium having stored therein a program which causes a data processing unit with a single system clock indicating the current date and time to perform:

providing a virtual system time storage area having a plurality of records, each of the records comprising a command name field, a date storage field, and a time storage field;

virtual system time setting processing for receiving, and storing in the virtual system time storage area, a date different from the current date indicated by said system clock and/or a time different from the current time indicated by said system clock from an input/output unit; and virtual system time converting processing responsive to a system date acquisition request from a command or a job in execution for returning, when a date is not stored in said virtual system time storage area, the current date indicated by said system clock and responsive to a system time acquisition request from the command or the job in execution for returning, when a time is not stored in said virtual system time storage area, the current time indicated by said system clock.

9. A recording medium having stored therein a program which causes a data processing unit with a single system clock indicating the current date and time to perform:

providing a virtual system time storage area having a plurality of records, each of the records comprising a command name field, a date storage field, and a time storage field;

virtual system time setting processing for receiving a command or job identifier from an input/output unit and storing the identifier into the command name field of an entry of said virtual system time storage area, for, when receiving a date different from the current date indicated by said system clock with the command or job identifier from the input/output unit, storing that date into the date storage field of the entry into which the command or job identifier is stored for, when receiving a time different from the current time indicated by said system clock with the command or job identifier from the input/output unit, storing that time into the time storage field of the entry into which the command or job identifier is stored; and virtual system time converting processing responsive to a system date acquisition request from a command or a job in execution for returning, either when a date is not stored in said date storage field of the entry corresponding to the identifier of the command or the job in said virtual system time storage area, the current date indicated by said system clock, or when a date is stored therein, that date stored in said date storage field and responsive to a system time acquisition request from the command or the job in execution for returning, either when a time is not stored in said time storage field of the entry corresponding to the identifier of the command or the job in said virtual system time storage area, the current time indicated by said system clock, or when a time is stored therein, that time stored in said time storage field.

10. A group of recording media, wherein said program of claim 7 is divided into a plurality of portions and said portions are recorded on said media, respectively.

11. A group of recording media, wherein said program claim 8 is divided into a plurality of portions and said portions are recorded on said media, respectively.

12. A group of recording media, wherein said program of claim 9 is divided into a plurality of portions and said portions are recorded on said media, respectively.

13. A program embodied in a electric signal which causes a data processing unit with a single system clock indicating the current date and time to perform:

providing a virtual system time storage area having a plurality of records, each of the records comprising a command name field, a date storage field, and a time storage field;

virtual system time setting processing for receiving, and storing in the virtual system time storage area, a date different from the current date indicated by said system clock and/or a time different from the current time indicated by said system clock from an input/output unit; and virtual system time converting processing responsive to a system date acquisition request from a command or a job in execution for returning, when a date is stored therein, that date stored in said virtual system time storage area and responsive to a system time acquisition request from the command or the job in execution for returning, when a time is stored therein, the sum of the current time indicated by said system clock and that time stored in said virtual system time storage area.

14. A program embodied in a electric signal which causes a data processing unit with a single system clock indicating the current date and time to perform:

providing a virtual system time storage area having a plurality of records, each of the records comprising a command name field, a date storage field, and a time storage field;

virtual system time setting processing for receiving, and storing in the virtual system time storage area, a date different from the current date indicated by said system clock and/or a time different from the current time indicated by said system clock from an input/output unit; and virtual system time converting processing responsive to a system date acquisition request from a command or a job in execution for returning, when a date is not stored in said virtual system time storage area, the current date indicated by said system clock and responsive to a system time acquisition request from the command or the job in execution for returning, when a time is not stored in said virtual system time storage area, the current time indicated by said system clock.

15. A program embodied in a electric signal which causes a data processing unit with a single system clock indicating the current date and time to perform:

providing a virtual system time storage area having a plurality of records, each of the records comprising a command name field, a date storage field, and a time storage field;

virtual system time setting processing for receiving a command or job identifier from an input/output unit and storing the identifier into the command name field of an entry of said virtual system time storage area, for, when receiving a date different from the current date indicated by said system clock with the command or job identifier from the input/output unit, storing that date into the date storage field of the entry into which the command or job identifier is stored for, when receiving a time different from the current time indicated by said system clock with the command or job identifier from the input/output unit, storing that time into the time storage field of the entry into which the command or job identifier is stored; and virtual system time converting processing responsive to a system date acquisition request from a command or a job in execution for returning, either when a date is not stored in said date storage field of the entry corresponding to the identifier of the command or the job in said virtual system time storage area, the current date indicated by said system clock, or when a date is stored therein, that date stored in said date storage field and responsive to a system time acquisition request from the command or the job in execution for returning, either when a time is not stored in said time storage field of the entry corresponding to the identifier of the command or the job in said virtual system time storage area, the current time indicated by said system clock, or when a time is stored therein, that time stored in said time storage field.

* * * * *